Jan. 15, 1952     O. CENTOFANTI     2,582,859
GAS LEAK DETECTOR
Filed July 8, 1947
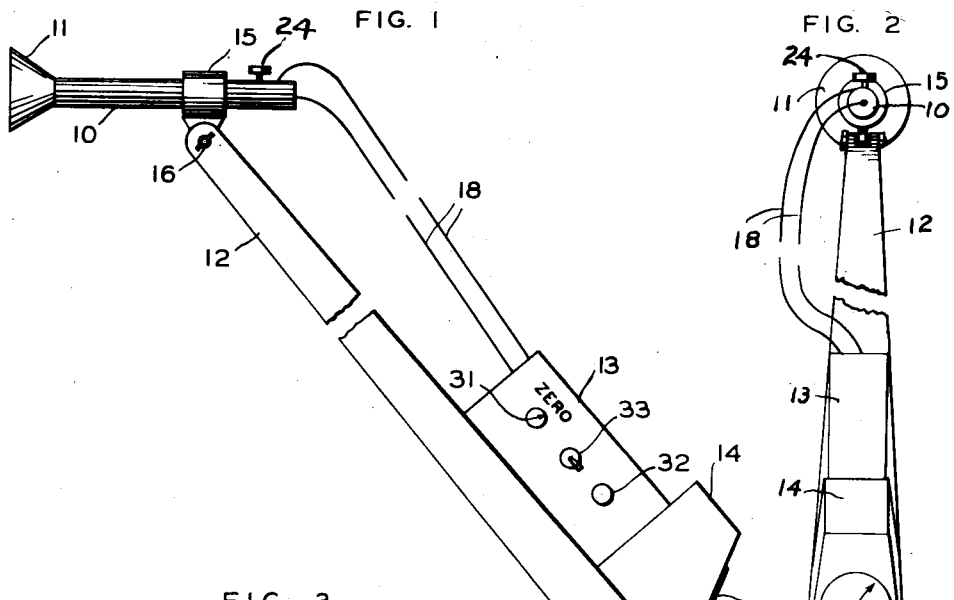
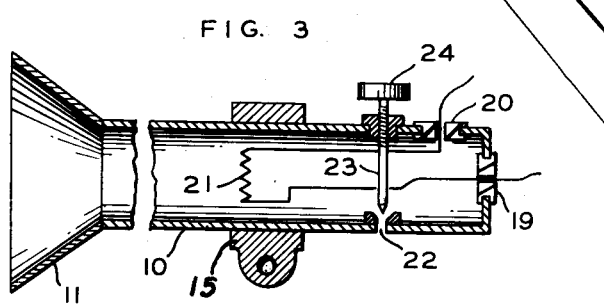
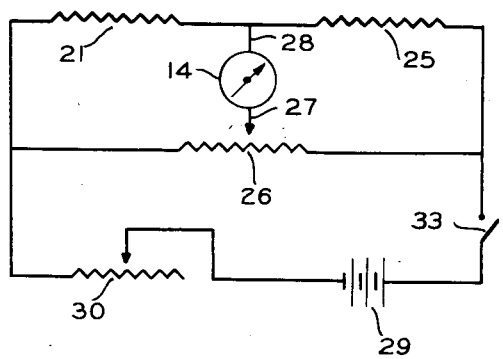
Olin Centofanti
INVENTOR.
BY James Y. Cleveland
ATTORNEY Patented Jan. 15, 1952

2,582,859

UNITED STATES PATENT OFFICE 2,582,859

GAS LEAK DETECTOR

Olin Centofanti, Paulsboro, N. J., assignor to Socony-Vacuum Oil Company, Incorporated, New York, N. Y., a corporation of New York Application July 8, 1947, Serial No. 759,567

1 Claim. (Cl. 73—27)

This invention relates to leak detectors and more particularly to means for detecting leaks such as those occurring in furnace walls.

Heretofore leak detectors have been devised for detecting gas leaks such as those which occur in the brick work of furnace walls, in the seams of tanks, or in or around pipe fittings. Although they have been proven to be effective they have not been very practical. An example is the detector formed by placing a candle in a box open at opposite ends. By placing one open end of the box over the suspected area and observing the flicker of the flame leaks could be detected within a given area with a degree of success.

The present invention provides a practical and efficient leak detector which will accurately locate gas leaks. The instant detector can be used to detect leaks of all kinds of gases without danger of igniting them. This is made possible by employing a Wheatstone bridge circuit in which one element thereof is sensitive to small changes in temperature. This element is disposed in an elongated tube which is provided with an exploring nozzle at one end and an adjustable orifice at the other whereby small gas currents through the tube which are occasioned by leaks will effect a temperature change in the sensitive element and consequently an unbalancing of the Wheatstone bridge. Current flowing in the bridge circuit can be indicated in the usual manner by a sensitive ammeter or galvanometer.

Therefore the principal object of this invention is to provide a practical and efficent leak detector which is portable, accurate, and safe to use for the detection of leaks of any kind of gas.

Another object of this invention resides in the provision of a leak detector that is electrical and will give a positive reading at all times.

Other objects and advantages of the present invention will become apparent from the following detailed description when considered with the drawings, in which:

Figure 1 is a side elevation of the device partly in vertical section showing the disposition of the leak sensitive element in detail;

Figure 2 is a front elevation of the device;

Figure 3 is an enlarged vertical section of the detector tube showing the disposition of the heat sensitive element and adjustable orifice; and Figure 4 is a wiring diagram of the bridge circuit used in the instrument.

Referring to the drawings in detail, there is shown in Figure 1 the complete instrument in side elevation. The device comprises a detector tube 10 having an exploring nozzle 11, an operating handle 12, a box 13 enclosing a Wheatstone bridge circuit and source of power, and a meter 14. The detector tube is secured to the operating handle by means of a collar 15 and a bolt 16. Bolt 16 may be provided with a winged nut for ready adjustment. On the lower end of the operating handle 12 the meter 14, which may be an ammeter or galvanometer, is mounted in any suitable manner directly on the handle with the dial 17 so positioned that it will face the operator when the detector is directed away from the operator. The unit 13 which encloses the Wheatstone bridge circuit is also secured to the operating handle adjacent the meter 14. Conductors 18 lead from the unit 13 to the detector tube 10. As shown in Figure 3, these leads are brought inside the tube 10 through insulating bushings 19 and 20. The inner ends of these leads are connected to a heat sensitive resistance 21. Resistance 21 may be formed of any material which has a high resistance temperature coefficient. I prefer to use tungsten wire such as that used in the manufacture of filaments for light bulbs. In order to control the amount of gas circulating through the detector tube there is provided an orifice 22 and a needle valve 23 therefore having an operating handle 24 outside of the detector tube 10.

The electrical circuit used in the instant invention is shown in Figure 4. All of the elements of this circuit, with the exception of the resistance 21, are enclosed in the unit 13 that is carried by the operating handle. As explained above, the resistance element 21 is located inside of the detector tube. This circuit is a Wheatstone bridge circuit. The four resistance elements are the resistance 21, a fixed resistance 25, the section of resistance 26 to the right of the contactor 27, and the section of resistance 26 to the left of the contactor 27. As shown, by means of the contactor 27 and the conductor 28, the meter 14 is connected directly across the bridge circuit. Power is supplied to the bridge circuit by means of a battery 29. This battery, having a variable resistance 30 connected in series with it, is connected directly across the opposite diagonal of the bridge circuit in the usual manner. The sensitivity of the detector can be controlled in either of two ways. One way is to adjust the needle valve 23 to regulate the amount of gases circulating through the tube 10. The second way is to vary the sensitivity of the apparatus by increasing the power supplied by battery 29. This can be accomplished by means of the adjustable resistance 30. Meter 14 can be nulled by adjusting the contact 27 on the resistance 26.

In operation when it is desired to detect leaks in the brick wall of a furnace the operator places the exploring nozzle 11 against the wall and moves it over the area to be explored. If any leaks are encountered the stimulated circulation of gas through the tube 10 over the resistance 21 will change the temperature of the resistor and as a result its resistance. This effects an unbalancing of the bridge circuit. The current flowing in the bridge circuit as a result of unbalancing will be indicated by the meter 14.

Although for purposes of illustration the exploring nozzle 11 has been shown as a divergent nozzle it is obvious that it can take any desired shape. The nozzle can be made convergent or made to have any other geometric configuration desired for the class of work for which it is to be used. The sensitivity of the instrument can be varied over a wide range by the adjustment controls 31 and 32. For convenience a switch is placed in series with the battery and resistance 30 so that when the instrument is not in use the power can be shut off. This switch is shown at 33 on the side of the unit 13.

We claim:

A gas leak detector comprising in combination an operating handle, a detector tube, means for pivotally securing said detector tube to one end of said handle, said detector tube being open at one end, means for closing the other end, means defining a passageway through the wall of the tube adjacent the closed end thereof, a valve adapted to register with said passageway to limit fluid passage therethrough, an external electrical circuit, a standard resistance in said external electrical circuit, means for housing said external circuit, means for securing said external circuit housing means to the opposite end of said operating handle, means within said housing for supplying electrical power to said circuit, heat sensitive means disposed in said tube at a point intermediate the open end of the tube and the passageway through the wall of the tube, means for connecting the heat sensitive means to the external electrical circuit to form with the external circuit and standard resistance a Wheatstone bridge, and means carried by said handle adjacent said housing for indicating the unbalanced bridge current flow in the external circuit.

OLIN CENTOFANTI.

REFERENCES CITED

The following references are of record in the file of this patent:

UNITED STATES PATENTS

| Number | Name | Date |
| --- | --- | --- |
| 1,231,045 | Means | June 26, 1917 |
| 1,444,771 | Baker | Feb. 13, 1923 |
| 1,455,263 | Oberfell | Mar. 15, 1923 |
| 2,297,868 | Bergeron | Oct. 6, 1942 |

FOREIGN PATENTS

| Number | Country | Date |
| --- | --- | --- |
| 174,338 | Great Britain | Feb. 22, 1923 |
| 479,723 | Germany | June 27, 1929 |

OTHER REFERENCES

Book: "Gas Analysis by Thermal Conductivity," H. A. Daynes, Cambridge. (Copy in Div. 36.)